(12) United States Patent
Mizoguchi

(10) Patent No.: US 11,795,312 B2
(45) Date of Patent: Oct. 24, 2023

(54) RESIN COMPOSITION FOR THREE-DIMENSIONAL MODELING, THREE-DIMENSIONAL MODELED ARTICLE, AND METHOD FOR MANUFACTURING THREE-DIMENSIONAL MODELED ARTICLE

(71) Applicant: Konica Minolta, Inc., Tokyo (JP)

(72) Inventor: Keisuke Mizoguchi, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 765 days.

(21) Appl. No.: 16/963,418

(22) PCT Filed: Jan. 17, 2019

(86) PCT No.: PCT/JP2019/001170
§ 371 (c)(1),
(2) Date: Jul. 20, 2020

(87) PCT Pub. No.: WO2019/146474
PCT Pub. Date: Aug. 1, 2019

(65) Prior Publication Data
US 2021/0087375 A1 Mar. 25, 2021

(30) Foreign Application Priority Data
Jan. 29, 2018 (JP) .................................. 2018-012865

(51) Int. Cl.
| | | |
|---|---|---|
| *C08L 23/12* | (2006.01) | |
| *B33Y 10/00* | (2015.01) | |
| *B29C 64/153* | (2017.01) | |
| *B29C 64/268* | (2017.01) | |
| *B33Y 40/10* | (2020.01) | |
| *C08L 25/06* | (2006.01) | |
| *B33Y 70/10* | (2020.01) | |
| *B29K 23/00* | (2006.01) | |
| *B29K 105/16* | (2006.01) | |
| *B29K 505/00* | (2006.01) | |
| *B29K 509/02* | (2006.01) | |
| *B29K 509/08* | (2006.01) | |
| *C08K 7/20* | (2006.01) | |

(52) U.S. Cl.
CPC ............ *C08L 23/12* (2013.01); *B29C 64/153* (2017.08); *B29C 64/268* (2017.08); *B33Y 10/00* (2014.12); *B33Y 40/10* (2020.01); *B33Y 70/10* (2020.01); *C08L 25/06* (2013.01); *B29K 2023/12* (2013.01); *B29K 2105/162* (2013.01); *B29K 2505/00* (2013.01); *B29K 2509/02* (2013.01); *B29K 2509/08* (2013.01); *B29K 2995/0097* (2013.01); *C08K 7/20* (2013.01); *C08K 2201/003* (2013.01); *C08K 2201/011* (2013.01); *C08L 2207/04* (2013.01)

(58) Field of Classification Search
CPC ...... C08L 23/12; C08L 25/06; C08L 2207/04; B32Y 10/00; B32Y 40/10; B32Y 70/10; B29C 64/153; B29C 64/268; B29K 2023/12; B29K 2105/162; B29K 2505/00; B29K 2509/02; B29K 2509/08; B29K 2995/0097; C08K 7/20; C08K 2201/003; C08K 2201/011; C08K 2207/04
USPC ......................................................... 526/351
See application file for complete search history.

(56) References Cited

U.S. PATENT DOCUMENTS

| | | | | |
|---|---|---|---|---|
| 2012/0202896 | A1* | 8/2012 | Blondel ................. | C08L 77/02 524/439 |
| 2016/0122541 | A1* | 5/2016 | Jaker ..................... | B29C 64/106 525/392 |
| 2019/0344499 | A1* | 11/2019 | Mizoguchi ............ | B29C 64/118 |
| 2021/0179792 | A1* | 6/2021 | Ju ........................... | C08L 55/02 |

FOREIGN PATENT DOCUMENTS

| | | | | |
|---|---|---|---|---|
| DE | 102018212447 | A1 * | 1/2020 | |
| JP | H09-52990 | A | 2/1997 | |
| JP | 11209480 | A * | 8/1999 | ............. C08J 11/12 |
| JP | H11-209480 | A | 8/1999 | |

(Continued)

OTHER PUBLICATIONS

PCT, International Search Report for the corresponding patent application No. PCT/JP2019/001170, dated Apr. 9, 2019, with English translation.
International Preliminary Report on Patentability and Written Opinion for the corresponding patent application No. PCT/JP2019/001170, dated Aug. 13, 2020.
EPO, Extended European Search Report for the corresponding European Patent Application No. 19743203.2, dated Feb. 23, 2021.

*Primary Examiner* — Michael M. Bernshteyn
(74) *Attorney, Agent, or Firm* — LUCAS & MERCANTI, LLP

(57) ABSTRACT

The present invention addresses the problem of providing a three-dimensional modeled article having high dimensional precision, high strength, and high ductility, and a resin composition for a three-dimensional modeled article, the resin composition being used to fabricate the three-dimensional modeled article, and of providing a method for manufacturing a three-dimensional modeled article. To address this problem, a resin composition for a three-dimensional modeled article according to the present invention contains resin particles having a continuous phase including a thermoplastic resin, and a dispersed phase including a thermoplastic elastomer, dispersed in the continuous phase, the amount of the thermoplastic elastomer therein being 1-12 parts by mass with respect to a total of 100 parts by mass of the thermoplastic resin and the thermoplastic elastomer.

10 Claims, No Drawings

(56) References Cited

FOREIGN PATENT DOCUMENTS

| | | |
|---|---|---|
| JP | 2007-533480 A | 11/2007 |
| JP | 2009-040870 A | 2/2009 |
| JP | 2009-132767 A | 6/2009 |
| WO | WO-2010032570 A1 * | 3/2010 ............. B29C 67/04 |
| WO | 2017/094738 A1 | 6/2017 |

* cited by examiner

RESIN COMPOSITION FOR THREE-DIMENSIONAL MODELING, THREE-DIMENSIONAL MODELED ARTICLE, AND METHOD FOR MANUFACTURING THREE-DIMENSIONAL MODELED ARTICLE

CROSS REFERENCE TO RELATED APPLICATION

This Application is a 371 of PCT/JP2019/001170 filed on Jan. 17, 2019 which, in turn, claimed the priority of Japanese Patent Application No. 2018-012865 filed on Jan. 29, 2018, both applications are incorporated herein by reference.

TECHNICAL FIELD

The present invention relates to a three-dimensional object-forming resin composition, a three-dimensional object, and a method for producing a three-dimensional object.

BACKGROUND ART

In recent years, various methods that enable relatively easy production of three-dimensional objects having complex shapes have been developed. Rapid prototyping and rapid manufacturing using such methods have been attracting attention.

These object production methods have been widely used in the field of modeling. In recent years, there has been an increasing trend of applying these methods directly to production. The resultant products that are three-dimensional objects are required to have high object-forming accuracy, high strength, and high ductility.

Among the methods for producing a three-dimensional object, there is a method of forming a thin layer composed of resin particles including a thermoplastic resin, and sintering or fusing together (hereafter, also simply referred to as "fusing") resin particles in a desired region, to obtain a three-dimensional object. Among various methods for producing a three-dimensional object, methods for producing a three-dimensional object using resin particles enable production of three-dimensional objects at higher object-forming accuracy than in other methods.

Among methods for producing a three-dimensional object in which resin particles are fused, there is a powder bed fusion method. In the powder bed fusion method, resin particles are flatly spread to form a thin layer, and the thin layer is irradiated with a laser beam in a pattern (a pattern provided by dividing the three-dimensional object into thin divisions arranged in the thickness direction). As a result, resin particles in the region irradiated with the laser beam are selectively fused. Furthermore, a step of spreading additional resin particles on the obtained object layer, and performing the same laser-beam irradiation as above is repeated to thereby obtain a three-dimensional object having a desired shape.

As another example of the methods for producing a three-dimensional object using resin particles, there is the following Multi Jet Fusion method (hereafter, also referred to as "MJF method") (for example, Patent Literature 1). Also in the MJF method, resin particles are first spread flatly to form a thin layer. Subsequently, in the thin layer, a region in which resin particles are to be fused together (hereafter, also referred to as "curing region") is coated with, for example, an energy absorbent, and irradiated with energy. Furthermore, a step of spreading additional resin particles on the obtained object layer, and performing the same procedures as above is repeated to thereby obtain a three-dimensional object having a desired shape.

In the above-described powder bed fusion method and MJF method, resin particles need to be sufficiently fused together by irradiation with energy. For this reason, materials usable as the resin particles are limited. Thus, as a matter of fact, there are no resin particles that provide both high mechanical strength and high ductility.

In a method for producing a three-dimensional object by injection molding, addition of a thermosetting vulcanized rubber to a thermoplastic resin has been proposed to improve the break elongation of the resultant three-dimensional object (for example, Patent Literature 2). In addition, a combination of an ionomer resin and a polyamide elastomer has also been proposed to improve the break elongation of the three-dimensional object (Patent Literature 3).

On the other hand, as the three-dimensional object-forming resin particles, particles prepared by adding, to a thermoplastic resin, a rubber-reinforced styrene-based resin composition having high compatibility with the thermoplastic resin, and melt-kneading these have also been proposed (Patent Literature 4).

CITATION LIST

Patent Literatures

PTL 1
Japanese Unexamined Patent Application Publication (Translation of PCT Application) No. 2007-533480
PTL 2
Japanese Patent Application Laid-Open No. H11-209480
PTL 3
Japanese Patent Application Laid-Open No. 2009-132767
PTL 4
Japanese Patent Application Laid-Open No. 2009-40870

SUMMARY OF INVENTION

Technical Problem

For the purpose of improving the ductility of the resultant three-dimensional object, the resin particles used for the powder bed fusion method or the MJF method may also be made to include thermosetting rubber particles as described in PTL 2. However, the thermosetting rubber particles added tend to inhibit fusion among the resin particles, which tends to result in a decrease in the strength of or a decrease in the object-forming accuracy of the resultant three-dimensional object. Alternatively, even in the case of applying the combination of an ionomer resin and a polyamide elastomer in PTL 3 to the resin particles used for the powder bed fusion method or the MJF method, it is difficult to achieve a sufficient increase in the ductility of the resultant three-dimensional object. Furthermore, in the resin particles of PTL 4 prepared by melt-kneading a thermoplastic resin and a rubber-reinforced styrene-based resin, the thermoplastic resin and the rubber-reinforced styrene-based resin are highly compatible with each other, and hence they mix; thus, the resultant three-dimensional object has high ductility, but does not have sufficient strength, which is problematic.

The present invention has been made in consideration of the above-described problem. Specifically, an object of the present invention is to provide a three-dimensional object that has high dimensional accuracy, high strength, and high ductility, and a three-dimensional object-forming resin composition used for producing the three-dimensional object, and to provide a method for producing a three-dimensional object.

Solution to Problem

The present invention provides the following three-dimensional object-forming resin composition and three-dimensional object.

[1] A three-dimensional object-forming resin composition comprising: a resin particle including a continuous phase including a thermoplastic resin, and a disperse phase dispersed in the continuous phase and including a thermoplastic elastomer, wherein an amount of the thermoplastic elastomer relative to 100 parts by mass of a total amount of the thermoplastic resin and the thermoplastic elastomer is 1 to 12 parts by mass.

[2] The three-dimensional object-forming resin composition according to [1], wherein the thermoplastic resin is polypropylene.

[3] The three-dimensional object-forming resin composition according to [1] or [2], wherein the thermoplastic elastomer includes a structure derived from styrene and a structure derived from ethylene.

[4] The three-dimensional object-forming resin composition according to any one of [1] to [3], further comprising a filler.

[5] The three-dimensional object-forming resin composition according to [4], wherein the resin particle includes the filler.

[6] The three-dimensional object-forming resin composition according to [4] or [5], wherein the filler is a spherical particle having a diameter of 1 to 1000 nm, a plate particle having a thickness of 1 to 1000 nm, or a fibrous particle having a fibrous diameter of 1 to 1000 nm.

[7] The three-dimensional object-forming resin composition according to any one of [4] to [6], wherein an amount of the filler relative to 100 parts by mass of the total amount of the thermoplastic resin and the thermoplastic elastomer is 5 to 30 parts by mass.

[8] A three-dimensional object being a cured product of the three-dimensional object-forming resin composition according to any one of [1] to [7].

The present invention provides the following method for producing a three-dimensional object.

[9] A method for producing a three-dimensional object, the method comprising:
forming a thin layer including the three-dimensional object-forming resin composition according to any one of [1] to [7]; and
selectively irradiating the thin layer with a laser beam to form an object layer in which a plurality of the resin particles are fused together,
wherein the forming and the irradiating are repeated a plurality of times to stack the object layer to form a three-dimensional object.

[10] A method for producing a three-dimensional object, the method comprising:
forming a thin layer including the three-dimensional object-forming resin composition according to any one of [1] to [7]; coating a specific region of the thin layer with a bonding fluid including an energy absorbent; and irradiating, after the coating, the thin layer with energy to form, in the region coated with the bonding fluid, an object layer in which a plurality of the resin particles are fused, wherein the forming, the coating, and the irradiating are repeated a plurality of times to stack the object layer to form a three-dimensional object.

Advantageous Effects of Invention

A three-dimensional object-forming resin composition according to the present invention provides a three-dimensional object having high dimensional accuracy, high strength, and high ductility.

DESCRIPTION OF EMBODIMENTS

1. Three-Dimensional Object-Forming Resin Composition

A three-dimensional object-forming resin composition according to the present invention is used for a method of fusing resin particles to produce a three-dimensional object, such as the powder bed fusion method or the MJF method. A three-dimensional object-forming resin composition according to the present invention at least includes a resin particle including a continuous phase including a thermoplastic resin, and a disperse phase including a thermoplastic elastomer. The three-dimensional object-forming resin composition may include, as needed, components other than the resin particle, for example, various additives or a flow agent.

As described above, in order to improve the ductility of the resultant three-dimensional object, the thermoplastic resin (resin particles) used for the powder bed fusion method or the MJF method may be prepared to include thermosetting rubber particles, or a thermoplastic resin and a thermoplastic elastomer having high compatibility with this thermoplastic resin may be melt-kneaded together. However, these methods provide three-dimensional objects that may have improved ductility, but that have lowered mechanical strength. Thus, three-dimensional objects that have high strength and high ductility have been difficult to produce.

In order to address this, the inventor of the present invention performed thorough studies and, as a result, has found that, in a thermoplastic resin, a thermoplastic elastomer having low compatibility with this thermoplastic resin is evenly dispersed to form disperse phases, to thereby obtain a three-dimensional object that has both of high strength and high ductility. The reason why the presence of the thermoplastic elastomer (disperse phases) scattered in the thermoplastic resin (continuous phase) improves the ductility is inferred as follows.

When such a three-dimensional object in which disperse phases including a thermoplastic elastomer are scattered in a thermoplastic resin (continuous phase) undergoes application of tensile stress, the thermoplastic elastomer expands, which results in relaxation of the stress applied to the thermoplastic resin. Further application of tensile stress causes generation of voids having sizes of several tens of nanometers within the thermoplastic elastomer (disperse phases) or at the interfaces between the thermoplastic resin and the thermoplastic elastomer. The voids stably expand, so that the thermoplastic resin (continuous phase) is less likely to undergo, for example, breakage, and sufficient strength is obtained. Incidentally, when the amount of the disperse phases is excessively large, disperse phases adjacent to each other tend to coalesce, or the voids tend to coalesce. As a result, under application of tensile stress, generation of, for example, cracks becomes even more likely to occur, resulting in lower strength. In addition, in this case, the resultant three-dimensional object tends to have a lower elastic modulus and lower mechanical strength. Thus, in the present invention, the amount of the thermoplastic elastomer relative to 100 parts by mass of the total amount of the thermoplastic resin and the thermoplastic elastomer is set to 1 to 12 parts by mass. When the amount of the thermoplastic elastomer satisfies this range, high strength and high ductility tend to be achieved. Hereinafter, components included in the three-dimensional object-forming resin composition will be described in detail.

1-1. Resin Particles

The resin particles are particles including a continuous phase including a thermoplastic resin, and disperse phases dispersed in this continuous phase and including a thermoplastic elastomer. More specifically, the particles include a large number of regions substantially evenly scattered in the thermoplastic resin and composed of a thermoplastic elastomer. Incidentally, the resin particles may further include a filler. In this case, preferably, the filler is also substantially evenly scattered in the continuous phase.

The shape of the resin particles is not particularly limited, and is preferably spherical from the viewpoint of improving the dimensional accuracy of the three-dimensional object. In addition, the resin particles preferably have an average particle size of 20 to 100 μm, more preferably 30 to 70 μm. When the resin particles have an average particle size of 100 μm or less, a three-dimensional object having a fine structure can be produced. On the other hand, the resin particles preferably have a size of 20 μm or more from the viewpoint of, for example, having sufficient flow ability and improving the production costs and the handleability. The average particle size is defined as the volume-average particle size measured by a dynamic light scattering method. The volume-average particle size can be measured with a laser-diffraction-type particle-size-distribution measurement apparatus equipped with a wet dispersion device (manufactured by MicrotracBEL Corp., MT3300EX II).

In the resin particles, the continuous phase at least includes a thermoplastic resin, and may include, for example, an additive, as needed. Examples of the thermoplastic resin included in the continuous phase include polyamide 12; polyolefin resins such as polypropylene; polylactic acid; polyphenylene sulfide (PPS); and polybutylene terephthalate. The continuous phase may include one thermoplastic resin alone, or may include two or more thermoplastic resins. The strength and formability of the three-dimensional object largely depend on the species of the resin constituting the continuous phase. Thus, from the viewpoint of facilitating formation of the object and improving the strength of the three-dimensional object, among those described above, preferred are polyamide 12 and polypropylene, and particularly preferred is polypropylene.

The amount of the thermoplastic resin in the resin particles relative to the mass of the resin particles is preferably 88 to 99 mass %, more preferably 90 to 95 mass % When the amount of the thermoplastic resin is 88 mass % or more, the resultant three-dimensional object tends to have improved mechanical strength. On the other hand, when the amount of the thermoplastic resin is 99 mass % or less, the amount of the thermoplastic elastomer (disperse phases) tends to become sufficient in relative terms, which tends to result in the improved ductility of the resultant three-dimensional object.

On the other hand, the disperse phases in the resin particles at least include a thermoplastic elastomer, and may be regions including the thermoplastic elastomer alone, or may be regions including the thermoplastic elastomer and, for example, additives.

The thermoplastic elastomer included in the disperse phases is preferably an elastomer that has low compatibility with the thermoplastic resin. Incidentally, when the thermoplastic elastomer and the thermoplastic resin have SP values close to each other, these tend to be compatible with each other. An elastomer that has low compatibility with the thermoplastic resin is employed, so that, in a method for producing a three-dimensional object described later, even when the resin particles are melted, the thermoplastic resin and the thermoplastic elastomer are less likely to be mixed. As a result, also in the resultant three-dimensional object, in the continuous phase including the thermoplastic resin, disperse phases including the thermoplastic elastomer can be scattered.

The thermoplastic elastomer preferably has a melting point or softening point close to the melting point or softening point of the thermoplastic resin in the continuous phase. When the thermoplastic elastomer and the thermoplastic resin have melting points or softening points that are close to each other, these tend to flow similarly during production of the three-dimensional object, so that, also in the resultant three-dimensional object, disperse phases including the thermoplastic elastomer tend to be scattered in the continuous phase including the thermoplastic resin. Incidentally, specifically, the melting point or softening point of the thermoplastic elastomer is preferably about 80 to about 120° C.

Examples of the thermoplastic elastomer include styrene-based elastomers such as a styrene elastomer, SIPS (styrene-isoprene-styrene), SBS (styrene-butadiene-styrene), SBBS (styrene-butadiene-butylene-styrene), SEBS (styrene-ethylene-butylene-styrene), and SEPS (styrene-ethylene-propylene-styrene). The disperse phases may include one thermoplastic elastomer alone, or may include two or more thermoplastic elastomers. Among those described above, from the viewpoint that the disperse phases tend to have an appropriately small size, preferred are elastomers including a structure derived from styrene and a structure derived from ethylene, and particularly preferred are SEBS and SEPS.

The shape of the disperse phases in the resin particles is not particularly limited, and is preferably spherical or ellipsoidal. In the resin particles, the disperse phases preferably have an average diameter of 1 to 500 nm, preferably 1 to 50 nm. When the disperse phases have an average diameter of 500 nm or less, the three-dimensional object is less likely to have a lowered elastic modulus. On the other hand, when the disperse phases have an average diameter of 1 nm or more, upon application of tensile stress to the three-dimensional object, voids generated within or around the disperse phases (thermoplastic elastomer) tend to provide relaxation of the tensile stress, so that the three-dimensional object tends to have improved ductility.

The presence or absence of the disperse phases and the average diameter of the disperse phases are determined in the following manner. First, the resin particles or a fusion product thereof is cut to expose a section. Ruthenium is used to stain regions including the thermoplastic elastomer. Subsequently, a transmission electron microscope is used to observe the section, to thereby determine the distribution state of the thermoplastic elastomer. At this time, when the thermoplastic elastomer is scattered in the section, the disperse phases are judged to be present. The average diameter of the disperse phases is determined by measuring the diameters of 100 disperse phases and averaging the measured diameters.

The amount of the thermoplastic elastomer in the resin relative to 100 parts by mass of the total amount of the thermoplastic resin and the thermoplastic elastomer is 1 to 12 parts by mass, more preferably 3 to 10 parts by mass, still more preferably 5 to 10 parts by mass. As described above, when the amount of the thermoplastic elastomer is 12 parts by mass or less, the resultant three-dimensional object tends to have improved mechanical strength. On the other hand, when the amount of the thermoplastic elastomer is 1 part by mass or more, the resultant three-dimensional object tends to have improved ductility.

The filler included in the resin particles is not particularly limited as long as it does not hinder an object and advantages of the present invention. When the resin particles include the filler, conduction of energy radiated during production of the three-dimensional object is facilitated, or the resultant three-dimensional object has improved strength. Examples of the filler include inorganic fillers such as talc, calcium carbonate, zinc carbonate, wollastonite, silica, alumina, magnesium oxide, calcium silicate, sodium aluminate, calcium aluminate, sodium aluminosilicate, magnesium silicate, glass balloons, glass cut fiber, glass milled fiber, glass flake, glass powder, silicon carbide, silicon nitride, gypsum, gypsum whisker, calcined kaolin, carbon black, zinc oxide, antimony trioxide, zeolite, hydrotalcite, metallic fiber, metallic whisker, metallic powder, ceramic whisker, potassium titanate, boron nitride, graphite, layered clay minerals, and carbon fiber; organic fillers such as nanofibers of polysaccharides; and various polymers. The resin particles may include one filler alone, or may include two or more fillers.

The filler preferably has an average particle size of about 0.01 to about 50 μm from the viewpoint of not inhibiting fusion of the resin particles. The average particle size of the filler is a volume-average particle size, and can be determined by removing, using a solvent or the like, the thermoplastic resin and the thermoplastic elastomer in the resin particles, and subsequently performing measurement using, for example, the above-described laser-diffraction-type particle-size-distribution measurement apparatus.

The filler is preferably, among those described above, from the viewpoint of having high conductivity for energy radiated during production of the three-dimensional object and tending to improve the mechanical strength and ductility of the three-dimensional object, spherical particles having a diameter of 1 to 1000 nm, plate particles having a thickness of 1 to 1000 nm, or fibrous particles having a fibrous diameter of 1 to 1000 nm.

The spherical particles may be particles composed of an inorganic material or particles composed of an organic material; examples include silica fine particles, alumina fine particles, titanium oxide fine particles, and zirconia fine particles.

When the filler is plate particles, the plate particles more preferably have a thickness of 50 to 500 nm, still more preferably 100 to 400 nm, particularly preferably 150 to 300 nm. In this Description, plate particles mean particles having two opposing flat main surfaces in which the distance (thickness) between these two flat main surfaces is sufficiently small relative to the maximum diameter and the minimum diameter of the flat main surfaces.

The shape of the flat main surfaces of such a plate particle may be circular, elliptical, or polygonal. The flat main surfaces of the plate particle preferably have a width of 1 to 10 μm, more preferably 2 to 8 μm. The ratio of the maximum diameter of the flat main surfaces to the thickness of the plate particle (maximum diameter of flat main surfaces/thickness) is preferably 5 to 15, more preferably 10 to 12. When the ratio of the maximum diameter of the flat main surfaces to the thickness of the plate particle satisfies such a range, the resin particles tend to have improved energy conductivity, which facilitates fusing together of the resin particles.

Examples of the plate particles include the above-described layered clay minerals (for example, kaolin; talc; mica; smectite-based minerals such as montmorillonite, beidellite, hectorite, saponite, nontronite, and stevensite; vermiculite; bentonite; layered sodium silicates such as kanemite, kenyaite, and magadiit; and mica group clay minerals such as Na-tetrasilicic fluorinated mica, Li-tetrasilicic fluorinated mica, Na-fluorinated taeniolite, and Li-fluorinated taeniolite). These plate particles may be obtained from naturally occurring minerals, or may be chemically synthesized. The plate particles may have surfaces modified (surface-treated) with, for example, an ammonium salt.

On the other hand, when the filler is fibrous, the fiber diameter is preferably, from the viewpoint of, for example, dispersibility, 3 to 30 nm, more preferably 5 to 20 nm. The fibrous filler preferably has a fiber length of 200 to 10000 nm, more preferably 250 to 10000 nm. When the fiber length is 10000 nm or less, the fibrous filler is less likely to protrude from the resin particles, which tends to provide a three-dimensional object having a good appearance. When the fiber length is 200 nm or more, the resultant three-dimensional object tends to have improved strength. Examples of the fibrous filler include carbon fiber and nanofibers of polysaccharides.

The amount of the filler in the resin particles relative to 100 parts by mass of the total amount of the thermoplastic resin and the thermoplastic elastomer is 5 to 30 parts by mass, more preferably 10 to 25 parts by mass, still more preferably 15 to 20 parts by mass. As described above, when the amount of the filler is 5 parts by mass or more, the resultant three-dimensional object tends to have improved mechanical strength. On the other hand, when the amount of the filler is 30 parts by mass or more, the filler tends to inhibit the function of the thermoplastic elastomer, and the resultant three-dimensional object tends to have lowered ductility.

The resin particles can be prepared by kneading, using, for example, a kneader, the thermoplastic resin that is to form the continuous phase and the thermoplastic elastomer that is to form the disperse phases, and performing pulverization using, for example, a freeze pulverizer. When the resin particles include the filler, they can be prepared by kneading and pulverizing the thermoplastic resin, the thermoplastic elastomer, and the filler.

1-2. Other Components

The three-dimensional object-forming resin composition may include components other than the resin particles as long as an object and advantages of the present invention are not hindered. For example, together with the resin particles, various fillers may be included. Such various fillers may be the same as the fillers included in the resin particles. The amount of such a filler relative to 100 parts by mass of the total amount of the resin particles is 5 to 30 parts by mass, more preferably 10 to 25 parts by mass, still more preferably 15 to 20 parts by mass. When the amount of the filler is 5 parts by mass or more, the resultant three-dimensional object tends to have improved mechanical strength. On the other hand, when the amount of the filler is 30 parts by mass or more, the filler tends to inhibit the function of the thermoplastic elastomer in the resin particles, and the resultant three-dimensional object tends to have lowered ductility.

On the other hand, the three-dimensional object-forming resin composition may include, for example, various additives and a flow agent. Examples of the various additives include antioxidants, acidic compounds and derivatives thereof, lubricants, ultraviolet absorbents, light stabilizers, nucleating agents, flame retardants, impact modifiers, blowing agents, coloring agents, organic peroxides, spreaders, and adhesives. The three-dimensional object-forming resin composition may include one of these alone, or may include two or more of these. These may be applied to the surfaces of the resin particles as long as an object of the present invention is not hindered.

The flow agent is a material that at least has a low friction coefficient and has self-lubricity. Examples of the flow agent include silicon dioxide and boron nitride. The three-dimensional object-forming resin composition may include one of the flow agents alone, or may include both of the flow agents. The amount of such a flow agent can be appropriately set as long as it improves the flow ability of the resin particles and the like, and the resin particles are sufficiently fused. For example, the amount relative to the mass of the thermoplastic resin may be set to more than 0 mass % and less than 2 mass %.

The three-dimensional object-forming resin composition used for the powder bed fusion method described later may include, for example, a laser absorbent. Examples of the laser absorbent include carbon powder, nylon resin powder, pigment, and dye. The three-dimensional object-forming resin composition may include one laser absorbent alone, or may include two or more laser absorbents.

2. Method for Producing Three-Dimensional Object

As described above, the above-described three-dimensional object-forming resin composition can be used for a method for producing a three-dimensional object by the powder bed fusion mode or the MJF mode. Hereinafter, three-dimensional object-forming methods using the above-described resin composition will be described. However, the present invention is not limited to these methods.

2-1. Method for Producing Three-Dimensional Object by Powder Bed Fusion Mode

The method for producing a three-dimensional object by the powder bed fusion mode can be performed as in the standard powder bed fusion mode except for use of the above-described three-dimensional object-forming resin composition. Specifically, the method includes (1) a thin layer formation step of forming a thin layer including the above-described three-dimensional object-forming resin composition, and (2) a laser beam irradiation step of selectively irradiating the thin layer with a laser beam, to form an object layer in which resin particles are fused together. The Step (1) and Step (2) are repeated a plurality of times to stack object layers, to thereby produce a three-dimensional object. Incidentally, the method for producing a three-dimensional object may include, as needed, another step, and may include, for example, a step of preliminarily heating the three-dimensional object-forming resin composition.

Thin Layer Formation Step (Step (1))

In this step, a thin layer including the three-dimensional object-forming resin composition is formed. For example, the three-dimensional object-forming resin composition supplied from a powder supply section of a three-dimensional object-forming apparatus is spread, using a recoater, flatly over an object-forming stage. The thin layer may be directly formed on the object-forming stage, or may be formed on a three-dimensional object-forming resin composition having been spread, or an object layer having been formed. Incidentally, the three-dimensional object-forming resin composition may be prepared to, as needed, further include a flow agent and a laser absorbent to form a thin layer.

The thickness of the thin layer is set to be the same as a desired thickness of the object layer. The thickness of the thin layer may be appropriately set in accordance with the accuracy of the three-dimensional object to be produced, and is ordinarily 0.01 mm or more and 0.30 mm or less. When the thickness of the thin layer is set to 0.01 mm or more, fusion of the underlying three-dimensional object-forming resin composition caused by laser beam irradiation for forming the next object layer can be prevented, and furthermore spreading evenly can be achieved. When the thickness of the thin layer is set to 0.30 mm or less, the energy of the laser beam can be conducted even to the lower portion of the thin layer, to sufficiently fuse the entirety (in the thickness direction) of the three-dimensional object-forming resin composition constituting the thin layer. From such viewpoints, the thickness of the thin layer is more preferably set to 0.01 mm or more and 0.10 mm or less. From the viewpoint of more sufficiently fusing the entirety (in the thickness direction of the thin layer) of the three-dimensional object-forming resin composition to further suppress cracking of the object layer, the thickness of the thin layer is preferably set so as to have a difference within 0.10 mm from the beam spot diameter of a laser beam described later.

Laser Beam Irradiation Step (Step (2))

In this step, of the thin layer including the three-dimensional object-forming resin composition, a position where the object layer is to be formed is selectively irradiated with a laser beam, to fuse resin particles in the irradiated position to form the object layer. At this time, the three-dimensional object-forming resin composition (resin particles) having received the energy of the laser beam is also fused to an object layer having been formed, and thus the adjacent layers are bonded together.

The wavelength of the laser beam can be set in the range of wavelengths absorbed by the three-dimensional object-forming resin composition (resin particles). In this case, the difference between the wavelength of the laser beam and the wavelength of the maximum absorption ratio of the three-dimensional object-forming resin composition is preferably set to be small; in general, thermoplastic resins absorb light in various wavelength regions, and hence a laser beam having a broad wavelength band such as $CO_2$ laser is preferably employed. For example, the wavelength of the laser beam may be set to, for example, 0.8 μm or more and 12 μm or less.

The power of the laser beam during its output is set to be within such a range that, at the scanning speed of the laser beam described later, the three-dimensional object-forming resin composition (resin particles) is sufficiently fused. Specifically, the power may be set to 5.0 W or more and 60 W or less. From the viewpoint of reducing the energy of the laser beam to achieve a reduction in the production costs and simplification of the configuration of the production apparatus, the power of the laser beam during its output is preferably 30 W or less, more preferably 20 W or less.

The scanning speed of the laser beam is set to be within such a range that the production costs do not increase and the configuration of the apparatus does not become excessively complex. Specifically, the scanning speed is preferably set to 1 m/s or more and 10 m/s or less, more preferably 2 m/s or more and 8 m/s or less, still more preferably 3 m/s or more and 7 m/s or less.

The beam diameter of the laser beam can be appropriately set in accordance with the accuracy of the three-dimensional object to be produced.

Regarding Repeating of Step (1) and Step (2)

During the production of the three-dimensional object, the above-described Step (1) and Step (2) are repeated desired times. As a result, object layers are stacked to obtain a desired three-dimensional object.

Preliminary Heating Step

As described above, the method for producing a three-dimensional object by the powder bed fusion mode may include the step of preliminarily heating the three-dimensional object-forming resin composition. The preliminary heating of the three-dimensional object-forming resin composition may be performed one or both of after the formation of the thin layer (Step (1)), and before the formation of the thin layer (Step (1)).

The preliminary heating temperature is set to a temperature lower than the melting temperature of the thermoplastic resin (continuous phase of the resin particles), to thereby prevent fusing together in the three-dimensional object-forming resin composition (resin particles). The preliminary heating temperature is appropriately selected in accordance with the melting temperature of the thermoplastic resin, and is, for example, 50° C. or more and 300° C. or less, more preferably 100° C. or more and 230° C. or less, still more preferably 150° C. or more and 190° C. or less.

In this case, the heating time is preferably set to 1 to 30 seconds, more preferably 5 to 20 seconds. Preliminary heating performed at the above-described temperature for such a time enables a reduction in the time taken for the three-dimensional object-forming resin composition (resin particles) to melt upon irradiation with laser energy, which enables production of the three-dimensional object with less amount of laser energy.

Other Remarks

Incidentally, from the viewpoint of preventing a decrease in the strength of the three-dimensional object caused by, for example, oxidation of the three-dimensional object-forming resin composition being fused, at least Step (2) is performed under a reduced pressure or in an inert gas atmosphere. The reduced pressure is preferably $10^{-2}$ Pa or less, more preferably $10^{-3}$ Pa or less. In this case, examples of the usable inert gas include nitrogen gas and rare gases. Of these inert gases, from the viewpoint of high availability, preferred are nitrogen ($N_2$) gas, helium (He) gas, and argon (Ar) gas. From the viewpoint of simplifying the production steps, both of Step (1) and Step (2) are preferably performed under a reduced pressure or in an inert gas atmosphere.

2-2. Method for Producing Three-Dimensional Object by MJF Mode

A method for producing a three-dimensional object according to this embodiment includes (1) a thin layer formation step of forming a thin layer including the above-described three-dimensional object-forming resin composition, (2) a fluid coating step of coating a specific region of the thin layer with a bonding fluid including an energy absorbent, and (3) an energy irradiation step of irradiating, after the fluid coating step, the thin layer with energy, to melt resin particles in the region coated with the bonding fluid to form an object layer. Incidentally, the method for producing a three-dimensional object may include, as needed, another step, and may include, for example, a step of preliminarily heating the three-dimensional object-forming resin composition.

(1) Thin Layer Formation Step

In this step, a thin layer mainly including the above-described three-dimensional object-forming resin composition is formed. The method of forming the thin layer is not particularly limited as long as a layer having a desired thickness can be formed. For example, this step may be a step of, using a recoater, spreading, flatly over an object-forming stage, the three-dimensional object-forming resin composition supplied from a resin composition supply section of a three-dimensional object-forming apparatus. The thin layer may be directly formed on the object-forming stage, or may be formed on and in contact with a three-dimensional object-forming resin composition having been spread or an object layer having been formed.

The thickness of the thin layer is set to be the same as a desired thickness of the object layer. The thickness of the thin layer can be appropriately set in accordance with the accuracy of the three-dimensional object to be produced, and is ordinarily 0.01 mm or more and 0.30 mm or less. When the thickness of the thin layer is set to 0.01 mm or more, an object layer having been formed can be prevented from being melted by irradiation with energy for forming a new object layer (irradiation with energy in the energy irradiation step described later). When the thickness of the thin layer is set to 0.01 mm or more, the powder material can be easily spread evenly. When the thickness of the thin layer is set to 0.30 mm or less, in the energy irradiation step described later, energy (such as infrared light) can be conducted even to the lower portion of the thin layer. This enables melting of the entirety of, in the thickness direction, resin particles in a desired region (region coated with the bonding fluid). From such a viewpoint, the thickness of the thin layer is more preferably 0.01 mm or more and 0.20 mm or less.

(2) Fluid Coating Step

In this step, the specific region of the thin layer formed in the thin layer formation step is coated with a bonding fluid including an energy absorbent. At this time, as needed, a region not coated with the bonding fluid may be coated with a release fluid that absorbs less energy than the bonding fluid. Specifically, a position where the object layer is to be formed is selectively coated with the bonding fluid, while a region where the object layer is not to be formed may be coated with the release fluid. Such an area around and in contact with the region coated with the bonding fluid is coated with the release fluid, so that, in the region coated with the release fluid, the resin particles become less likely to be fused. The order of performing coating with the bonding fluid and coating with the release fluid is not limited. Preferably, coating with the bonding fluid is first performed from the viewpoint of the dimensional accuracy of the resultant three-dimensional object.

The process of coating with the bonding fluid and the release fluid is not particularly limited. Examples of the coating process include coating using a dispenser, coating by an inkjet process, and spray coating. From the viewpoint that desired regions can be coated at a high speed with the bonding fluid and the release fluid, at least one of these is preferably used for coating by an inkjet process, and both of these are more preferably used for coating by an inkjet process.

The coating amount of each of the bonding fluid and the release fluid relative to 1 $mm^3$ of the thin layer is preferably 0.1 to 50 μL, more preferably 0.2 to 40 μL. When the coating amounts of the bonding fluid and the release fluid satisfy such a range, the powder material in the region where the object layer is to be formed and the powder material in the region where the object layer is not to be formed can be respectively sufficiently impregnated with the bonding fluid and the release fluid, to form a three-dimensional object having high dimensional accuracy.

The bonding fluid used for coating in this step may be the same as the existing bonding fluid used in the MJF mode, and may be, for example, a composition at least including, for example, an energy absorbent and a solvent. The bonding fluid may include, as needed, a publicly known dispersant, for example.

The energy absorbent is not particularly limited as long as it absorbs energy provided by irradiation in the energy irradiation step described later, to efficiently increase the temperature of the region coated with the bonding fluid. Specific examples of the energy absorbent include infrared absorbents such as carbon black, ITO (indium tin oxide), and ATO (antimony tin oxide), and infrared absorbing pigments such as cyanine pigments, phthalocyanine pigments having aluminum or zinc at the center, various naphthalocyanine compounds, nickel dithiolene complexes having a four-coordinated planar structure, squarylium pigments, quinone-based compounds, diimmonium compounds, and azo compounds. Of these, from the viewpoint of versatility and enabling an efficient increase in the temperature of the region coated with the bonding fluid, preferred are infrared absorbents, and more preferred is carbon black.

The shape of the energy absorbent is not particularly limited, and is preferably a particulate shape. Its average particle size is preferably 0.1 to 1.0 µm, more preferably 0.1 to 0.5 µm. When the energy absorbent has an excessively large average particle size, upon coating of the thin layer with the bonding fluid, the energy absorbent is less likely to enter the gaps between the resin particles. On the other hand, when the energy absorbent has an average particle size of 0.1 µm or more, in the energy irradiation step described later, heat can be efficiently conducted to the resin particles, to melt the surrounding resin particles.

The bonding fluid preferably has an energy absorbent content of 0.1 to 10.0 mass %, more preferably 1.0 to 5.0 mass % When the energy absorbent content is 0.1 mass % or more, in the energy irradiation step described later, the temperature of the region coated with the bonding fluid can be sufficiently increased. On the other hand, when the energy absorbent content is 10.0 mass % or less, for example, the energy absorbent is less likely to aggregate within the bonding fluid, which tends to result in improved coating stability of the bonding fluid.

On the other hand, the solvent is not particularly limited as long as it is a solvent in which the energy absorbent is dispersible, and resin particles (in particular, the thermoplastic resin) and the like in the three-dimensional object-forming resin composition are less likely to dissolve, and may be, for example, water.

In the bonding fluid, the content of the solvent is preferably 90.0 to 99.9 mass %, more preferably 95.0 to 99.0 mass %. When the solvent content in the bonding fluid is 90.0 mass % or more, the bonding fluid has improved flow ability, and is easily used for coating by, for example, an inkjet process.

The bonding fluid preferably has a viscosity of 0.5 to 50.0 mPa·s, more preferably 1.0 to 20.0 mPa·s. When the bonding fluid has a viscosity of 0.5 mPa·s or more, diffusion of the bonding fluid upon coating of the thin layer tends to be suppressed. On the other hand, when the bonding fluid has a viscosity of 50.0 mPa·s or less, the bonding fluid tends to have improved coating stability.

On the other hand, the release fluid used for coating in this step is a fluid that at least absorbs less energy than the bonding fluid, and may be, for example, a fluid that includes water as a main component.

The release fluid preferably has a water content of 90 mass % or more, more preferably 95 mass % or more. When the release fluid has a water content of 90 mass % or more, it is easily used for coating by, for example, an inkjet process.

(3) Energy Irradiation Step

In this step, the thin layer after the fluid coating step, that is, the thin layer coated with the bonding fluid and the release fluid is irradiated with energy collectively. At this time, in the region coated with the bonding fluid, the energy absorbent absorbs energy, to selectively increase the temperature of this region. Thus, resin particles in this region alone are melted, to form an object layer.

The species of the energy used for irradiation in this step is appropriately selected in accordance with the species of the energy absorbent included in the bonding fluid. Specific examples of the energy include infrared light and white light. Of these, in the region coated with the bonding fluid, the resin particles can be efficiently melted. On the other hand, from the viewpoint that, in the region coated with the release fluid, the temperature of the thin layer is less likely to increase, preferred is infrared light, more preferred is light of wavelengths of 780 to 3000 nm, and more preferred is light of wavelengths of 800 to 2500 nm.

In this step, the time for irradiation with energy is appropriately selected in accordance with the species of the resin particles (in particular, the thermoplastic resin) included in the three-dimensional object-forming resin composition, and is ordinarily preferably 5 to 60 seconds, more preferably 10 to 30 seconds. When the energy irradiation time is set to 5 seconds or more, the resin particles can be sufficiently melted and bonded together. On the other hand, when the energy irradiation time is set to 60 seconds or less, the three-dimensional object can be efficiently produced.

Preliminary Heating Step

Also in the MJF mode, the step of preliminarily heating the three-dimensional object-forming resin composition may be performed. The preliminary heating of the three-dimensional object-forming resin composition may be performed one or both of after the formation of the thin layer (Step (1)) and before the formation of the thin layer (Step (1)). The preliminary heating enables a reduction in the amount of energy used for irradiation in the (3) energy irradiation step, and, in addition, enables efficient formation of the object layer in a short time. The preliminary heating temperature is preferably a temperature that is lower than the melting temperature of the thermoplastic resin, and that is lower than the boiling point of the solvent included in the bonding fluid and the release fluid used for coating in the (2) fluid coating step. Specifically, the temperature is preferably 50° C. to 5° C. lower than, more preferably 30° C. to 5° C. lower than the melting point of the thermoplastic resin in the resin particles and the boiling point of the solvent included in the bonding fluid and the release fluid. In this case, the heating time is preferably set to 1 to 60 seconds, more preferably set to 3 to 20 seconds. When the heating temperature and the heating time are set so as to satisfy such ranges, a reduction in the energy irradiation dose in the (3) energy irradiation step can be achieved.

EXAMPLES

Hereinafter, specific examples according to the present invention will be described. Incidentally, these examples do not limit the construction of the scope of the present invention.

Example 1

As the thermoplastic resin, polyamide 12 (manufactured by Daicel-Evonik Ltd., DAIAMID L1600 ("DAIAMID" is a registered trademark of this company)) was prepared. As the thermoplastic elastomer, a styrene-based elastomer (manufactured by Mitsubishi Chemical Corporation, T331C) was prepared. The polyamide 12 (99 parts by mass) was mixed with 1 part by mass of the styrene-based elastomer, and these were kneaded using a small kneader (manufactured by Xplore Instruments BV, MC15) to prepare pellets. The pellets were pulverized by a freeze-pulverization method until the average particle size measured using a laser-diffraction-type particle-size-distribution measurement apparatus equipped with a wet dispersion device (manufactured by SYMPATEC GmbH, HELOS) reached 50 μm, to obtain a three-dimensional object-forming resin composition composed of Resin particles 1.

Example 2

A three-dimensional object-forming resin composition composed of Resin particles 2 was prepared as in Example 1 except that 95 parts by mass of the polyamide 12 was kneaded with 5 parts by mass of the styrene-based elastomer.

Example 3

A three-dimensional object-forming resin composition composed of Resin particles 3 was prepared as in Example 1 except that 88 parts by mass of the polyamide 12 was kneaded with 12 parts by mass of the styrene-based elastomer.

Example 4

A three-dimensional object-forming resin composition composed of Resin particles 4 was prepared as in Example 2 except that, as the material for the resin, a polypropylene resin (manufactured by SunAllomer Ltd., PM600A) was employed.

Example 5

A three-dimensional object-forming resin composition composed of Resin particles 5 was prepared as in Example 4 except that, as the thermoplastic elastomer, SBS (styrene-butadiene-styrene) (manufactured by Asahi Kasei Corporation, Tufprene) was employed.

Example 6

A three-dimensional object-forming resin composition composed of Resin particles 6 was prepared as in Example 4 except that, as the thermoplastic elastomer, SEBS (styrene-ethylene-butylene-styrene) (manufactured by Asahi Kasei Corporation, Tuftec H) was employed.

Example 7

As the thermoplastic resin, polypropylene (manufactured by SunAllomer Ltd., PM600A) was prepared. As the thermoplastic elastomer, SEBS (manufactured by Asahi Kasei Corporation, H1521) was prepared. As the filler, glass particles (manufactured by TOYOBO CO., LTD., PEE-301, average particle size: 10 μm) were prepared. These were mixed such that 69 parts by mass of polypropylene was mixed with 1 part by mass of SEBS and 30 parts by mass of the glass particles, and kneaded using a small kneader (manufactured by Xplore Instruments BV, MC15). The resultant kneaded product was pulverized by a freeze-pulverization method until the average particle size measured using a laser-diffraction-type particle-size-distribution measurement apparatus equipped with a wet dispersion device (manufactured by SYMPATEC GmbH, HELOS) reached 50 μm to prepare a three-dimensional object-forming resin composition composed of Resin particles 7.

Example 8

A three-dimensional object-forming resin composition composed of Resin particles 8 was prepared as in Example 7 except that, as the filler, instead of the glass particles, a product (plate particles) prepared by pulverizing talc (manufactured by HAYASHI KASEI CO., LTD., Micron White #5000) using a Jiyu mill (manufactured by Nara Machinery Co., Ltd., M-2) to a thickness of 300 nm and a width of 5 μm was employed.

Example 9

A three-dimensional object-forming resin composition composed of Resin particles 9 was prepared as in Example 8 except that 79 parts by mass of polypropylene was kneaded with 1 part by mass of SEBS and 20 parts by mass of talc.

Comparative Example 1

Polyimide 12 (manufactured by Daicel-Evonik Ltd., DAIAMID L1600 ("DAIAMID" is a registered trademark of this company)) was pulverized by a freeze-pulverization method until the average particle size measured using a laser-diffraction-type particle-size-distribution measurement apparatus equipped with a wet dispersion device (manufactured by SYMPATEC GmbH, HELOS) reached 50 μm, to prepare a three-dimensional object-forming resin composition composed of Resin particles 10.

Comparative Example 2

A three-dimensional object-forming resin composition composed of Resin particles 11 was prepared as in Example 1 except that 85 parts by mass of polyimide 12 was mixed with 15 parts by mass of the styrene-based elastomer.

Comparative Example 3

A three-dimensional object-forming resin composition composed of Resin particles 12 was prepared as in Example 4 except that the styrene-based elastomer was not mixed.

[Evaluations]
(1) Production of Three-Dimensional Objects

Such a three-dimensional object-forming resin composition prepared was spread over an object-forming stage disposed on a hot plate to form a thin layer having a thickness of 0.1 mm, and heated at 150° C. (preliminary heating temperature) by controlling the temperature of the hot plate. This thin layer (area having dimensions of 15 mm×20 mm) was irradiated with a laser beam from a CO$_2$ laser equipped with a YAG-wavelength galvanometer scanner under conditions described below, to form an object layer. Subsequently, over this object layer, the three-dimensional object-forming resin composition was further spread, and irradiated with the laser beam, to form an overlying object layer. These steps were repeated until the three-dimensional object (stack of object layers) reached a height of 55 mm.

[Emission Conditions of Laser Beam]
Laser output power: 12 W
Wavelength of laser beam: 10.6 μm
Beam diameter: 170 μm at surface of thin layer

[Scanning Conditions of Laser Beam]
Scanning speed: 2000 mm/sec
Number of lines: 1

(2) Measurement of Elastic Modulus and Break Elongation

The obtained three-dimensional object was placed on a tensile testing apparatus (manufactured by A&D Company, Limited, TENSILON RTC-1250), and drawn at a rate of 1 mm/min in a direction perpendicular to the stacking plane of the object layers, to measure the elastic modulus (strength). Furthermore, the same apparatus was used to draw the object at a rate of 50 mm/min in the direction perpendicular to the stacking plane of the object layers, to measure break elongation (ductility). Incidentally, regarding elastic modulus and break elongation, Examples 1 to 3 and Comparative example 2 relative to Blank 1 formed of 100 mass % of PA12 (Comparative example 1), and Examples 4 to 9 relative to Blank 2 formed of 100 parts by mass of polypropylene (Comparative example 3) were evaluated in accordance with grading systems described below.

(Elastic Modulus)

The elastic modulus was evaluated on the basis of a change ratio represented by the following expression.

Change ratio of elastic modulus={(Elastic modulus of three-dimensional object−Elastic modulus of Blank)/Elastic modulus of Blank}*100

A: The change ratio is 30% or more
B: The change ratio is −10% or more and less than 30%
C: The change ratio is less than −10%

(Break Elongation)

The break elongation was evaluated on the basis of the following change ratio.

Change ratio of break elongation={(Break elongation of three-dimensional object−Break elongation of Blank)/Break elongation of Blank}*100

AA: The change ratio was 80% or more
A: The change ratio was 50% or more and less than 80%
B: The change ratio was 10% or more and less than 50%
C: The change ratio was less than 10%

(3) Determination of Presence or Absence of Disperse Phases

In each of Examples and Comparative examples above, the kneaded product prior to pulverization of the resin was cut to expose a section. This section was stained with ruthenium, and observed with a transmission electron microscope (manufactured by JEOL Ltd., JEM-2000FX), to determine the presence or absence of disperse phases. At this time, the sizes of 100 disperse phases were measured and averaged; as a result, such average values of the sizes of disperse phases were all found to be 1 to 500 nm.

TABLE 1

| | Thermoplastic resin | | Thermoplastic elastomer | | Filler | | Presence or absence of disperse phases | Elastic modulus | Break elongation (elongation ratio) |
|---|---|---|---|---|---|---|---|---|---|
| | Species | Content (parts by mass) | Species | Content (parts by mass) | Species | Content (parts by mass) | | | |
| Example 1 | PA12 | 99 | Styrene-based elastomer | 1 | None | — | Present | B | B (12%) |
| Example 2 | PA12 | 95 | Styrene-based elastomer | 5 | None | — | Present | B | B (22%) |
| Example 3 | PA12 | 88 | Styrene-based elastomer | 12 | None | — | Present | B | B (28%) |
| Example 4 | PP | 95 | Styrene-based elastomer | 5 | None | — | Present | B | A (52%) |
| Example 5 | PP | 95 | SBS | 5 | None | — | Present | B | A (55%) |
| Example 6 | PP | 95 | SEBS | 5 | None | — | Present | B | AA (95%) |
| Example 7 | PP | 69 | SEBS | 1 | Glass particles | 30 | Present | A | B (35%) |
| Example 8 | PP | 69 | SEBS | 1 | Talc | 30 | Present | A | A (59%) |
| Example 9 | PP | 79 | SEBS | 1 | Talc | 20 | Present | A | AA (83%) |
| Comparative example 1 | PA12 | 100 | None | — | None | — | Absent | — | — |
| Comparative example 2 | PA12 | 85 | Styrene-based elastomer | 15 | None | — | Present | C | C (8%) |
| Comparative example 3 | PP | 100 | None | — | None | — | Absent | — | — |

As is clear from Table 1 above, in the cases of employing a three-dimensional object-forming resin composition including resin particles including a continuous phase including a thermoplastic resin and disperse phases including a thermoplastic elastomer wherein the amount of the thermoplastic elastomer relative to 100 parts by mass of the total amount of the thermoplastic resin and the thermoplastic elastomer is 1 to 12 parts by mass, the resultant three-dimensional objects exhibited high elastic moduli and high break elongations (Examples 1 to 9). This is inferentially because the thermoplastic elastomers included as disperse phases provided relaxation of the tensile stress, which resulted in improved break elongations. On the other hand, since the amounts of the thermoplastic elastomers were appropriate, the elastic moduli were inferentially less likely to decrease. In summary, the three-dimensional object-forming resin compositions according to Examples provide three-dimensional objects that have both of high strength and high ductility.

In particular, in the cases where the resin particles include a filler, the elastic moduli tended to become higher (Examples 7 to 9). In particular, in the cases where plate particles (talc) are included, break elongations were also found to be good (Examples 8 and 9).

By contrast, in the cases where thermoplastic elastomers are not included, the break elongations were found to be insufficient (Comparative example 1 and Comparative example 3). In the case where the amount of the thermoplastic elastomer is excessively large, the break elongation was good, but the elastic modulus lowered (Comparative example 2).

The present application claims priority to Japanese Patent Application No. 2018-012865 filed Jan. 29, 2018. The content described in the Description of this application is incorporated herein by reference in its entirety.

INDUSTRIAL APPLICABILITY

Three-dimensional object-forming resin compositions according to the present invention enable accurate formation of three-dimensional objects by a method such as the powder bed fusion method or the MJF method, and the resultant three-dimensional objects have both of high strength and high ductility. Thus, the present invention will inferentially contribute to a further increase in the prevalence of the three-dimensional object-forming methods.

The invention claimed is:

1. A three-dimensional object-forming resin composition comprising: a resin particle including a continuous phase including a thermoplastic resin, and a disperse phase dispersed in the continuous phase and including a thermoplastic elastomer,
wherein an amount of the thermoplastic elastomer relative to 100 parts by mass of a total amount of the thermoplastic resin and the thermoplastic elastomer is 1 to 12 parts by mass.

2. The three-dimensional object-forming resin composition according to claim 1, wherein the thermoplastic resin is polypropylene.

3. The three-dimensional object-forming resin composition according to claim 1, wherein the thermoplastic elastomer includes a structure derived from styrene and a structure derived from ethylene.

4. The three-dimensional object-forming resin composition according to claim 1, further comprising a filler.

5. The three-dimensional object-forming resin composition according to claim 4, wherein the resin particle includes the filler.

6. The three-dimensional object-forming resin composition according to claim 4, wherein the filler is a spherical particle having a diameter of 1 to 1000 nm, a plate particle having a thickness of 1 to 1000 nm, or a fibrous particle having a fibrous diameter of 1 to 1000 nm.

7. The three-dimensional object-forming resin composition according to claim 4, wherein an amount of the filler relative to 100 parts by mass of the total amount of the thermoplastic resin and the thermoplastic elastomer is 5 to 30 parts by mass.

8. A three-dimensional object being a cured product of the three-dimensional object-forming resin composition according to claim 1.

9. A method for producing a three-dimensional object, the method comprising:
forming a thin layer including the three-dimensional object-forming resin composition according to claim 1; and
selectively irradiating the thin layer with a laser beam to form an object layer in which a plurality of the resin particles are fused together,
wherein the forming and the irradiating are repeated a plurality of times to stack the object layer to form a three-dimensional object.

10. A method for producing a three-dimensional object, the method comprising:
forming a thin layer including the three-dimensional object-forming resin composition according to claim 1;
coating a specific region of the thin layer with a bonding fluid including an energy absorbent; and
irradiating, after the coating, the thin layer with energy to form, in the region coated with the bonding fluid, an object layer in which a plurality of the resin particles are fused together,
wherein the forming, the coating, and the irradiating are repeated a plurality of times to stack the object layer to form a three-dimensional object.

* * * * *